(12) United States Patent
Mori et al.

(10) Patent No.: US 11,269,470 B2
(45) Date of Patent: Mar. 8, 2022

(54) OPERATION SUPPORT DEVICE, TOUCH PANEL DEVICE, AND TOUCH PANEL INPUT SYSTEM

(71) Applicant: Mitsubishi Electric Corporation, Tokyo (JP)

(72) Inventors: Kentaro Mori, Tokyo (JP); Yuichi Sasaki, Tokyo (JP); Atsushi Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/895,516

(22) Filed: Jun. 8, 2020

(65) Prior Publication Data

US 2020/0301547 A1   Sep. 24, 2020

Related U.S. Application Data

(63) Continuation of application No. PCT/JP2017/044887, filed on Dec. 14, 2017.

(51) Int. Cl.
*G06F 3/0488* (2013.01)
*G06F 3/044* (2006.01)
*G06F 3/041* (2006.01)

(52) U.S. Cl.
CPC .......... *G06F 3/0447* (2019.05); *G06F 3/0412* (2013.01); *G06F 3/0488* (2013.01)

(58) Field of Classification Search
CPC .... G06F 3/0362; G06F 3/0393; G06F 3/0412; G06F 3/044; G06F 3/0447; G06F 3/0488
See application file for complete search history.

(56) References Cited

U.S. PATENT DOCUMENTS

2006/0256090 A1   11/2006   Huppi
2011/0157056 A1*  6/2011   Karpfinger ............ G06F 3/0488
                                                                345/173
(Continued)

FOREIGN PATENT DOCUMENTS

DE   10 2010 026 303 A1   1/2012
JP   2010-257077 A   11/2010
(Continued)

OTHER PUBLICATIONS

German Office Action for German Application No. 11 2017 008 192.0, dated Feb. 24, 2021, with English translation.
(Continued)

*Primary Examiner* — Temesghen Ghebretinsae
*Assistant Examiner* — Sosina Abebe
(74) *Attorney, Agent, or Firm* — Birch, Stewart, Kolasch & Birch, LLP

(57) ABSTRACT

An operation support device that is placed on a touch panel detecting a change in electrostatic capacitance or a change in a contact region, includes: a case part; a first member attached inside the case part; a first deforming member that is an elastic member provided on an end of the first member and is provided between the first member and the touch panel; and a wall part that is attached inside the case part and sets a direction of deformation of the first deforming member when the case part approaches the touch panel, to a predetermined direction. As the case part approaches the touch panel, the electrostatic capacitance in a region facing the first defaming member increases due to defamation of the first deforming member or area of the contact region of the first defaming member increases due to deformation of the first defaming member.

11 Claims, 10 Drawing Sheets

(56) References Cited

U.S. PATENT DOCUMENTS

| | | | |
|---|---|---|---|
| 2012/0113061 A1 | 5/2012 | Ikeda | |
| 2013/0093702 A1* | 4/2013 | Argiro | G06F 3/0219 345/173 |
| 2013/0249830 A1* | 9/2013 | Quek | G06F 3/0393 345/173 |
| 2017/0316901 A1* | 11/2017 | Sawada | H01H 15/06 |
| 2018/0024649 A1* | 1/2018 | Uno | G06F 3/0416 345/174 |
| 2020/0278761 A1* | 9/2020 | Takaoka | G06F 3/0412 |

FOREIGN PATENT DOCUMENTS

| | | |
|---|---|---|
| JP | 2013-45259 A | 3/2013 |
| JP | 2013-178678 A | 9/2013 |
| JP | 5482023 B2 | 4/2014 |
| JP | 5705767 B2 | 4/2015 |
| JP | 2017-37611 A | 2/2017 |

OTHER PUBLICATIONS

Office Action dated Aug. 26, 2021 in corresponding Indian Patent Application No. 202047023670.

* cited by examiner

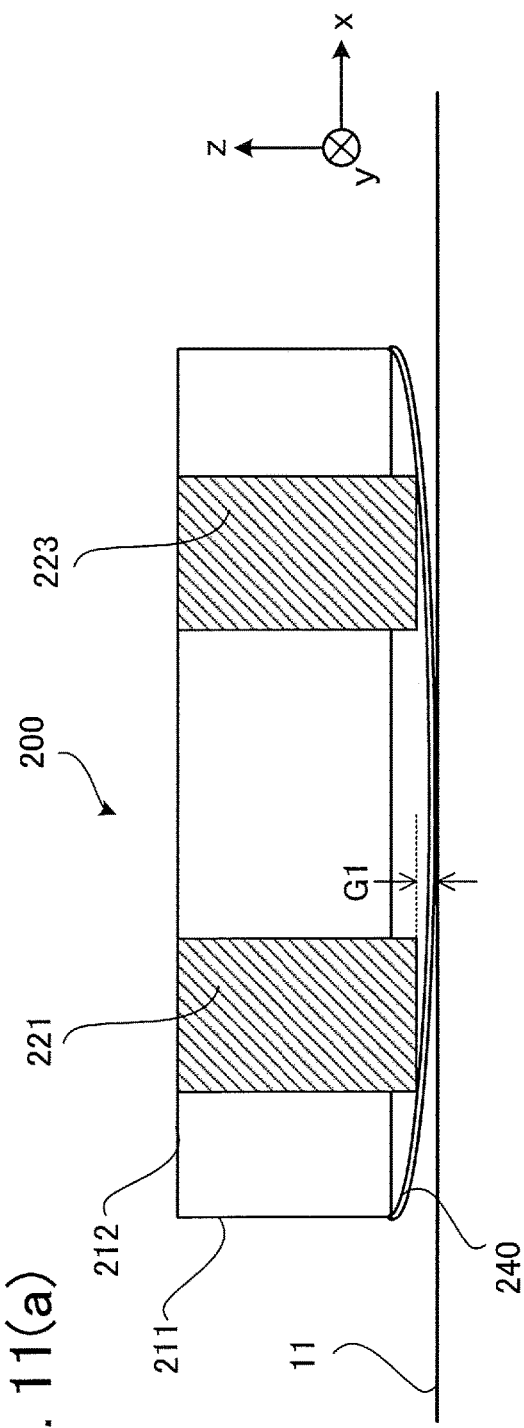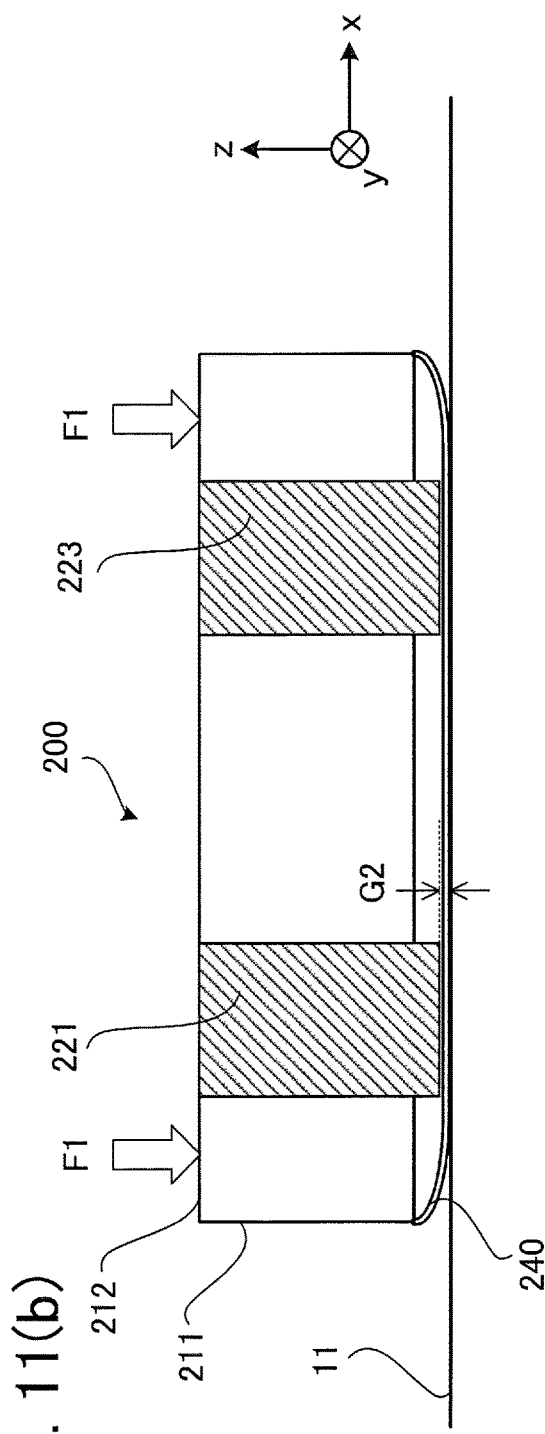

OPERATION SUPPORT DEVICE, TOUCH PANEL DEVICE, AND TOUCH PANEL INPUT SYSTEM

CROSS-REFERENCE TO RELATED APPLICATION

This application is a continuation application of International Application No. PCT/JP2017/044887 having an international filing date of Dec. 14, 2017.

BACKGROUND OF THE INVENTION

1. Field of the Invention

The present invention relates to an operation support device that supports an input operation performed through a touch panel, a touch panel device including a touch panel, and a touch panel input system including the touch panel device and the operation support device.

2. Description of the Related Art

There has been proposed a knob-type operation support device (referred to also as an "operation knob") that is placed on a touch panel (referred to also as a "touch display" or a "touch screen") included in a touch panel device and performs an input operation equivalent to a touch operation performed with a finger touching the touch panel, when the operation support device is rotated or slid by a user's hand (see Patent References 1 and 2, for example). By using the operation knob, an input operation equivalent to a rotation operation or a slide operation performed with a finger touching the touch panel can be carried out by rotating or sliding the operation knob placed on the touch panel.

Patent Reference 1: Japanese Patent Application Publication No. 2013-178678 (Paragraphs 0013 to 0020, FIGS. 1 to 3).

Patent Reference 2: Japanese Patent Application Publication No. 2010-257077 (Paragraphs 0030 to 0036, FIG. 5).

However, the conventional operation knob has a problem in that an input operation equivalent to a touch operation of pressing a finger against a touch panel cannot be performed correctly.

SUMMARY OF THE INVENTION

An object of the present invention is to enable a touch panel device to correctly recognize an input operation performed by using an operation support device placed on a touch panel.

An operation support device according to an aspect of the present invention is a device that is placed on a touch panel detecting a change in electrostatic capacitance or a change in a contact region and supports an input operation performed through the touch panel. The operation support device includes: a case part; a first member attached inside the case part; a first deforming member that is an elastic member provided on an end of the first member and is provided between the first member and the touch panel; and a wall part that is attached inside the case part and sets a direction of deformation of the first defaming member when the case part approaches the touch panel, to a predetermined direction. As the case part approaches the touch panel, the electrostatic capacitance in a region facing the first defaming member increases due to deformation of the first defaming member or area of the contact region of the first deforming member increases due to defamation of the first deforming member.

According to the present invention, a touch panel device is capable of correctly recognizing an input operation performed by using the operation support device placed on the touch panel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(a) and 11(b) are cross-sectional views showing the internal structure and an operation of the operation knob according to the second embodiment;

DETAILED DESCRIPTION OF THE INVENTION

Figure 1A:
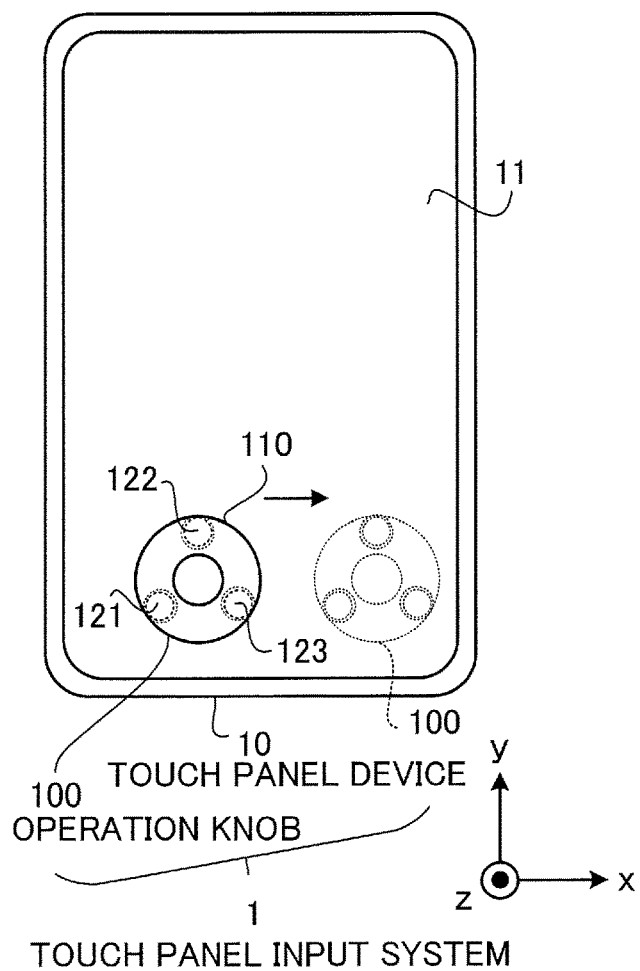
FIGS. 1(a) and 1(b) are plan views schematically showing a configuration of a touch panel input system according to a first embodiment of the present invention.

First to fourth embodiments of the present invention will be described below with reference to the accompanying drawings. The first to fourth embodiments are just examples and a variety of modifications are possible within the scope of the present invention. Further, it is possible to properly combine features of some of the first to fourth embodiments.

An xyz orthogonal coordinate system is shown in the drawings. An x-axis and a y-axis are coordinate axes parallel to a touch surface, that is, a front surface of a touch panel. Thus, a position on the touch panel can be represented by xy coordinates. A z-axis is a coordinate axis orthogonal to the front surface of the touch panel. Therefore, by moving an operation knob as an operation support device in the z-axis direction, an operation of bringing the operation knob close to the touch panel or an operation of separating the operation knob from the touch panel can be carried out.

(1) First Embodiment

(1-1) Touch Panel Input System

Figure 1B:
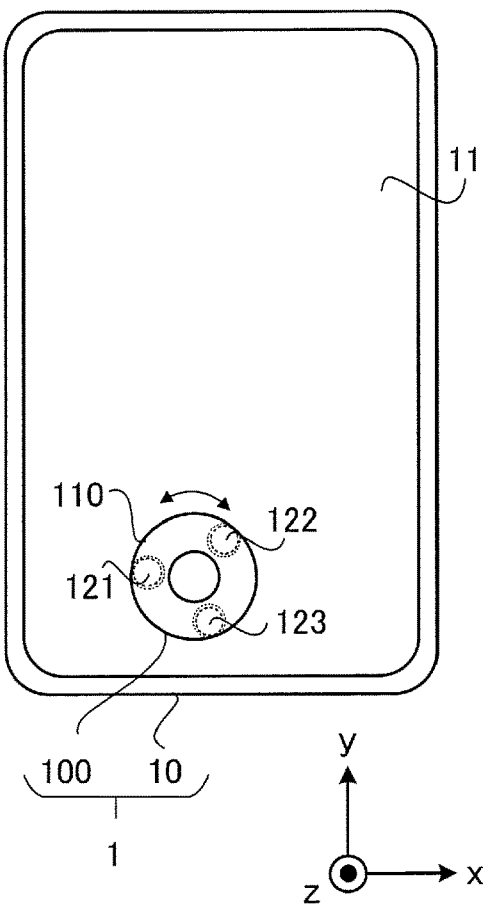

FIGS. 1(a) and 1(b) are plan views schematically showing a configuration of a touch panel input system 1 according to a first embodiment. As shown in FIGS. 1(a) and 1(b), the touch panel input system 1 includes a touch panel device 10 having a touch panel 11 and an operation knob 100 as an operation support device that is placed on the touch panel 11 and supports an input operation performed by a user. The touch panel input system is referred to also as a "knob on a touch display".

The touch panel device 10 has a display function on the touch panel 11 and an input function through the touch panel 11. The touch panel device 10 is capable of detecting an input position (i.e., touch position) on the touch panel 11 and pressing force at the input position based on a change in electrostatic capacitance in the touch panel 11 or a change in a contact region on the touch panel 11. The touch panel device 10 is capable of receiving a touch operation performed with a user's finger touching the touch panel 11. For example, when the user's finger makes contact with the touch panel 11, an increase in the electrostatic capacitance in a region of the contact of the touch panel 11 is detected, or pressing force on the contact region is detected.

Further, by performing an operation using the operation knob 100 placed on the touch panel 11, the user can carry out an input operation equivalent to the touch operation performed with the user's finger touching the touch panel 11. Incidentally, in the following embodiment, a description will be given of an example in which the touch panel device 10 recognizes the operation performed by using the operation knob 100 by detecting a change in the electrostatic capacitance of the touch panel 11. However, the detection of the touch position (i.e., touch point) by the touch panel device 10 may also be made by a method other than the detection of the electrostatic capacitance.

By use of the operation knob 100 placed on the touch panel 11, input operations equivalent to a rotation operation (referred to also as a "dial operation") and a slide operation (referred to also as a "moving operation") as touch operations performed with a finger touching the touch panel 11 can be performed by rotating (shown in FIG. 1(b)) or sliding (shown in FIG. 1(a)) the operation knob 100 placed on the touch panel 11.

Further, by use of the operation knob 100, it is possible to perform an input operation equivalent to a touch operation of pressing a finger against the touch panel 11 (e.g., a tap as an operation of momentarily pressing a finger against the touch panel, a press and hold as an operation of keeping on pressing a finger against the touch panel, etc.). In other words, the touch panel device 10 is capable of correctly recognizing the start and the end of depressing the operation knob 100 placed on the touch panel 11. Alternatively, the touch panel device 10 is capable of correctly recognizing the start and the end of pulling up the operation knob 100 placed on the touch panel 11.

(1-2) Operation Support Device

Figure 2:
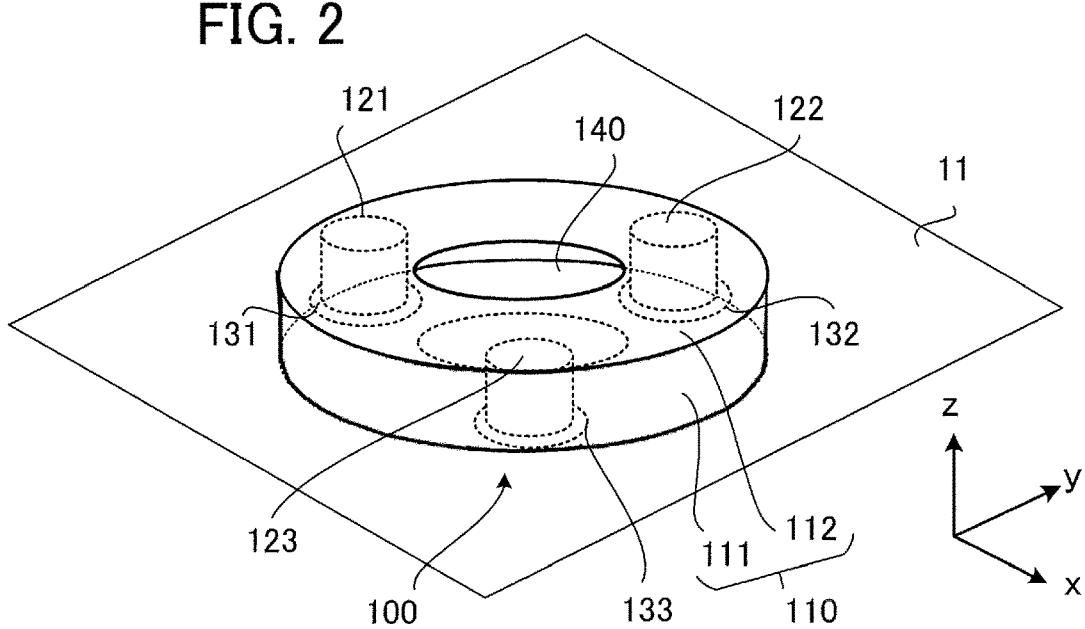
FIG. 2 is a perspective view schematically showing a structure of an operation knob as an operation support device according to the first embodiment.
Figure 3A:
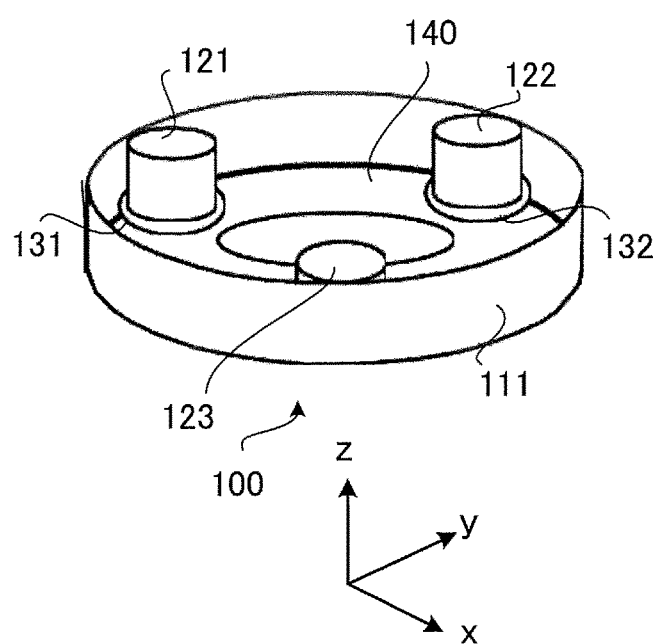
FIGS. 3(a) and 3(b) are a perspective view and a plan view schematically showing an internal structure of the operation knob according to the first embodiment.
Figure 3B:
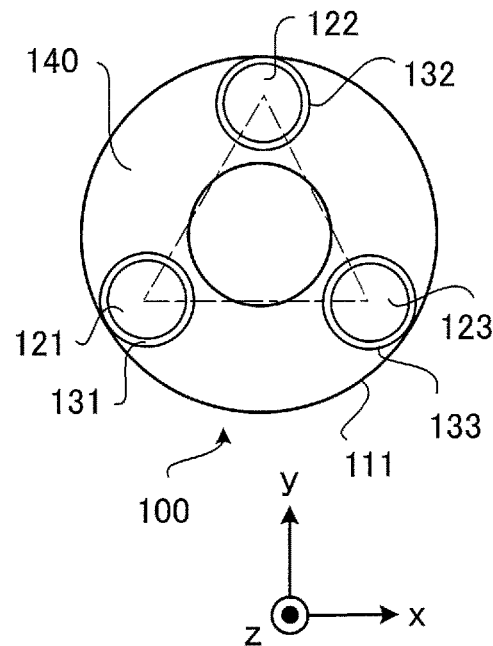

FIG. 2 is a perspective view schematically showing a structure of the operation knob 100 according to the first embodiment. FIGS. 3(a) and 3(b) are a perspective view and a plan view schematically showing an internal structure of the operation knob 100.

As shown in FIG. 2 and FIGS. 3(a) and 3(b), the operation knob 100 includes a case part 110 as a grip part to be gripped by the user, columnar members 121, 122 and 123 as first members attached inside the case part 110, and cushion members 131, 132 and 133 as first deforming members provided between the touch panel 11 and the columnar members 121, 122 and 123 and capable of deforming. The cushion members 131, 132 and 133 are respectively attached to lower ends of the columnar members 121, 122 and 123.

The columnar members 121, 122 and 123 and the cushion members 131, 132 and 133 are formed of electrically conductive material, that is, conductors. The columnar members 121, 122 and 123 and the cushion members 131, 132 and 133 are electrically connected to each other. The cushion members 131, 132 and 133 can be formed of, for example, resin being conductors. The cushion members 131, 132 and 133 may be formed with elastic members.

The columnar members 121, 122 and 123 are arranged at a plurality of predetermined positions. As shown in FIG. 3(b), the three columnar members 121, 122 and 123 are desired to be arranged at positions separate from each other by the same distance. Namely, in the first embodiment, the distance between two adjacent columnar members among the three columnar members 121, 122 and 123 is equal. In other words, the three columnar members 121, 122 and 123 are respectively arranged at three apex positions of a regular triangle.

The number of the columnar members is not limited to three but may also be two or less or four or more. For example, when the number of the columnar members is four, the four columnar members are desired to be respectively arranged at four apex positions of a square. The positions of a plurality of columnar members may be other positions as long as the positions have predetermined positional relationship. Further, the shape and size of the columnar member are not limited to the illustrated shape and size but can also be different shape and size as long as the shape and size allow the electrostatic capacitance of the touch panel 11 to change in a detectable manner.

As shown in FIG. 2, the case part 110 includes a side wall part 111 in a cylindrical shape and an upper surface part 112 in a ring shape, for example. Further, between the touch panel 11 and the cushion members 131, 132 and 133, there is provided a deformable and thin sheet-like lower surface part 140 attached to a lower end of the side wall part 111 of the case part 110. Incidentally, the shape of the case part 110 is not limited to the illustrated shape but can also be a different shape as long as the shape allows the user to grip the case part 110. Further, the shape of the lower surface part 140 is not limited to the illustrated shape but can also be a different shape.

Figure 4A:
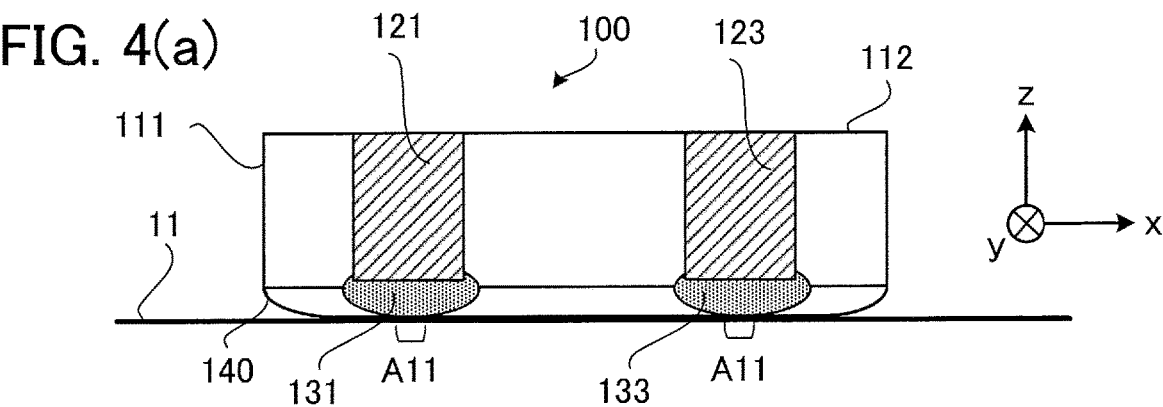
FIGS. 4(a) and 4(b) are cross-sectional views showing the internal structure and an operation of the operation knob according to the first embodiment.
Figure 4B:
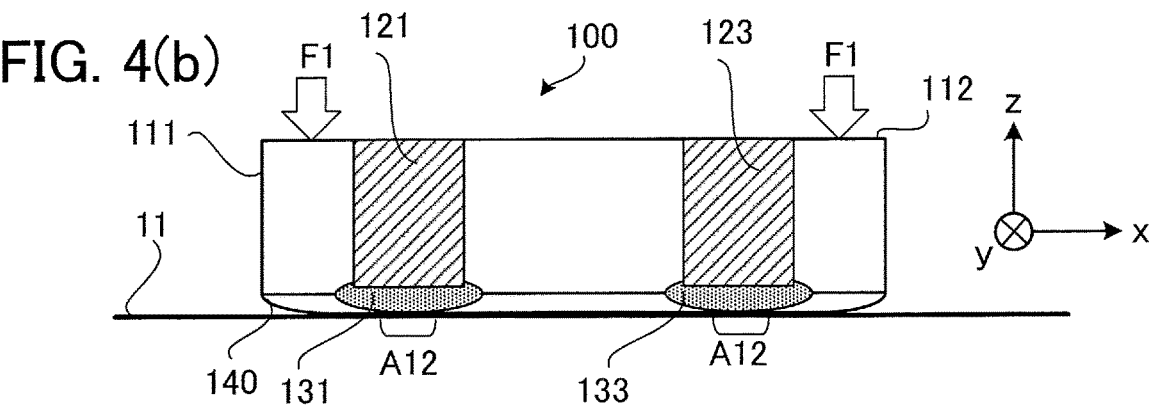

FIGS. 4(a) and 4(b) are cross-sectional views showing an internal structure and an operation of the operation knob 100. FIG. 4(a) shows a state in which the operation knob 100 is not depressed towards the touch panel 11, and FIG. 4(b) shows a state in which the operation knob 100 is depressed towards the touch panel 11. In this case, the operation knob 100 is placed in the state of FIG. 4(b) by depressing the operation knob 100, and returns to the initial state of FIG. 4(a) by ending the depressing of the operation knob 100 due to elastic restoring force of the cushion members 131, 132 and 133. Incidentally, the force returning the operation knob 100 to the initial position may also be applied by a different elastic member not shown (e.g., spring).

As shown in FIGS. 4(a) and 4(b), as the case part 110 approaches the touch panel 11 due to depressing operation by the user to apply downward force F1 to the case part 110 of the operation knob 100, deformation of the cushion members 131, 132 and 133 increases and the area of contact between the cushion members 131, 132, 133 and the lower surface part 140 increases. Specifically, in the case of FIG. 4(a), the force F1 is not applied, and thus the deformation of the cushion members 131, 132 and 133 is small and the area A11 of contact between the cushion members 131, 132, 133 and the lower surface part 140 is small. In contrast, in the case of FIG. 4(b), the force F1 is applied, and thus the deformation of the cushion members 131, 132 and 133 is large and the area A12 of contact between the cushion members 131, 132, 133 and the lower surface part 140 is larger than the contact area A11.

The electrostatic capacitance of the touch panel 11 increases with the increase in the area of a conductor in contact with the touch panel 11 or existing in the vicinity of the touch panel 11, that is, the area of a facing conductor (referred to also as "the area of the facing region"). Thus, in the state in which the operation knob 100 is depressed as shown in FIG. 4(b), the area of the facing region of the touch panel 11 and each cushion member 131, 132, 133 is large and the detection value of the electrostatic capacitance is high. Accordingly, the touch panel device 10 is capable of acquiring the input positions (referred to also as "touch positions"), as the positions of the columnar members 121, 122 and 123, namely, the positions of the cushion members 131, 132 and 133, and detection values of the electrostatic capacitance corresponding to the pressing force of the operation knob 100.

(1-3) Touch Panel Device

Figure 5:
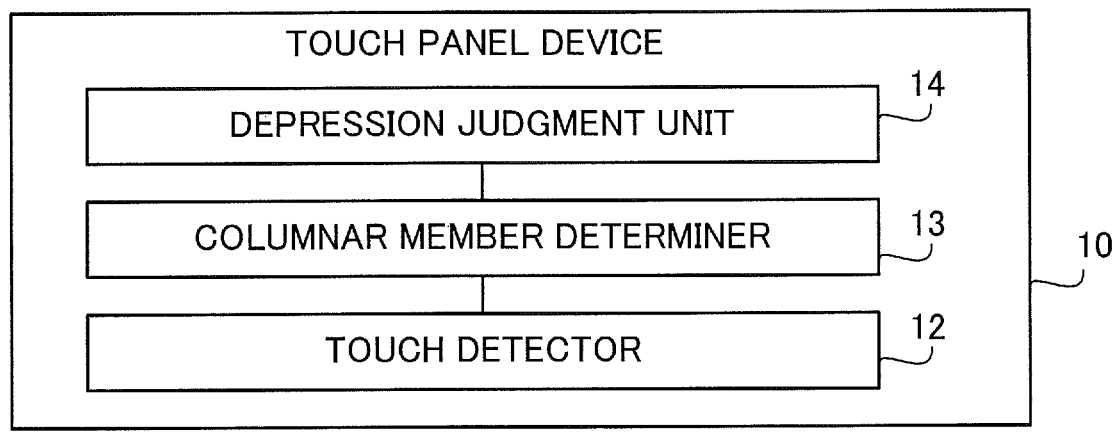
FIG. 5 is a functional block diagram schematically showing a principal configuration of a touch panel device according to the first embodiment.

FIG. 5 is a functional block diagram schematically showing the principal configuration of the touch panel device 10 according to the first embodiment. As shown in FIG. 5, the touch panel device 10 includes a touch detector 12, a columnar member determiner 13 and a depression judgment unit 14.

The touch detector 12 detects the touch positions on the touch panel 11. The touch positions include a position of contact of a user's finger and positions of the columnar members 121, 122 and 123 of the operation knob 100. Detecting the touch positions means, for example, detecting coordinates of the touch positions on the touch panel 11 and the electrostatic capacitance corresponding to the pressing force at the touch positions and outputting these pieces of information as detection information.

The columnar member determiner 13 determines the positions of the columnar members 121, 122 and 123 of the operation knob 100 by extracting touch positions having the predetermined positional relationship (e.g., three positions arranged at distances equal to each other) based on detection values regarding all the touch positions outputted from the touch detector 12.

The depression judgment unit 14 judges whether the operation knob 100 is in the state of being depressed towards the touch panel device 10 (e.g., the state of FIG. 4(b)) or in the state of not being depressed (e.g., the state of FIG. 4(a)) based on the three positions of the columnar members 121, 122 and 123 of the operation knob 100 determined by the columnar member determiner 13 and the detection values of the electrostatic capacitance at the three positions.

As above, the touch panel device 10 is capable of correctly distinguishing whether the operation is an operation with the operation knob 100 or an operation with the user's finger based on the predetermined positional relationship among the three columnar members 121, 122 and 123 of the operation knob 100.

Further, when it is judged that there occurred an operation with the operation knob 100, the touch panel device 10 is capable of correctly distinguishing whether the operation with the operation knob 100 is the rotation operation, the slide operation or the depressing operation based on the change in the electrostatic capacitance (e.g., movement of the detection positions, the change in the detection values, etc.).

Figure 6:
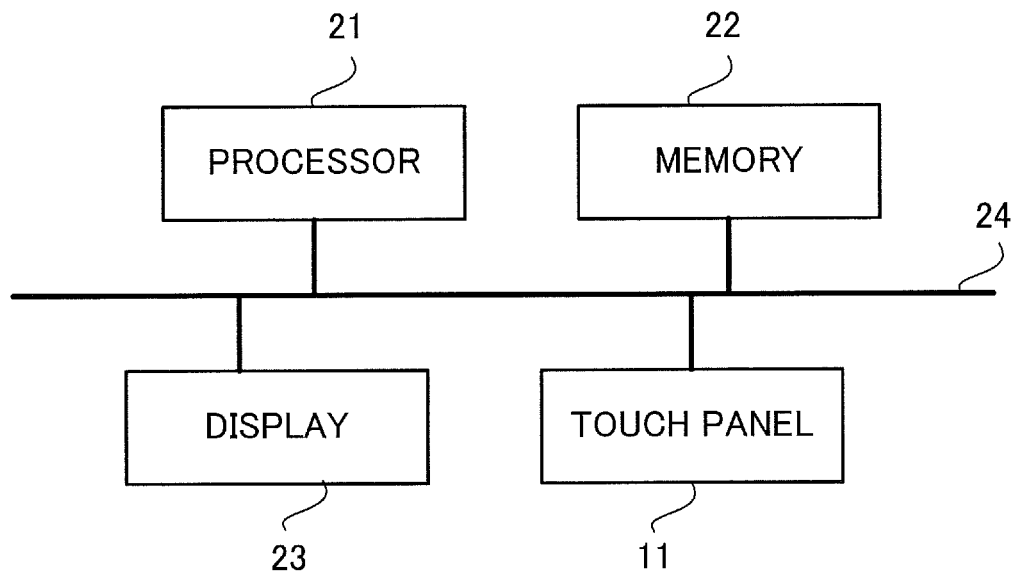
FIG. 6 is a diagram schematically showing a hardware configuration of the touch panel device according to the first embodiment.

FIG. 6 is a diagram schematically showing a hardware configuration of the touch panel device 10. The touch panel device 10 may be implemented by a processing circuitry. However, as shown in FIG. 6, the touch panel device 10 may also be implemented by using a memory 22 as a storage device storing a program as software and a processor 21 as an information processing unit executing the program stored in the memory 22. Incidentally, it is also possible to implement part of the touch panel device 10 with the memory 22 shown in FIG. 6 and the processor 21 executing a program. A display 23 displays an operation screen. The operation knob 100 is properly set on the touch panel 11 or attached to the touch panel 11.

The touch panel 11 detects contact of a finger or positions of the columnar members 121, 122 and 123 of the operation knob 100 and transmits touch information to the processor 21 via a bus 24. The touch information includes, for example, identification information or position coordinates of each touch position, contact status of each touch position, the detection value of the electrostatic capacitance at each touch position, the contact area at each touch position, and so forth. The processor 21 stores the touch information acquired from the touch panel 11 in the memory 22, identifies the columnar members 121, 122 and 123 of the operation knob 100 based on history information on the touch information accumulated in the memory 22, and judges whether or not the operation knob 100 is depressed based on the touch information regarding the positions of the columnar members 121, 122 and 123.

(1-4) Operation

Figure 7:
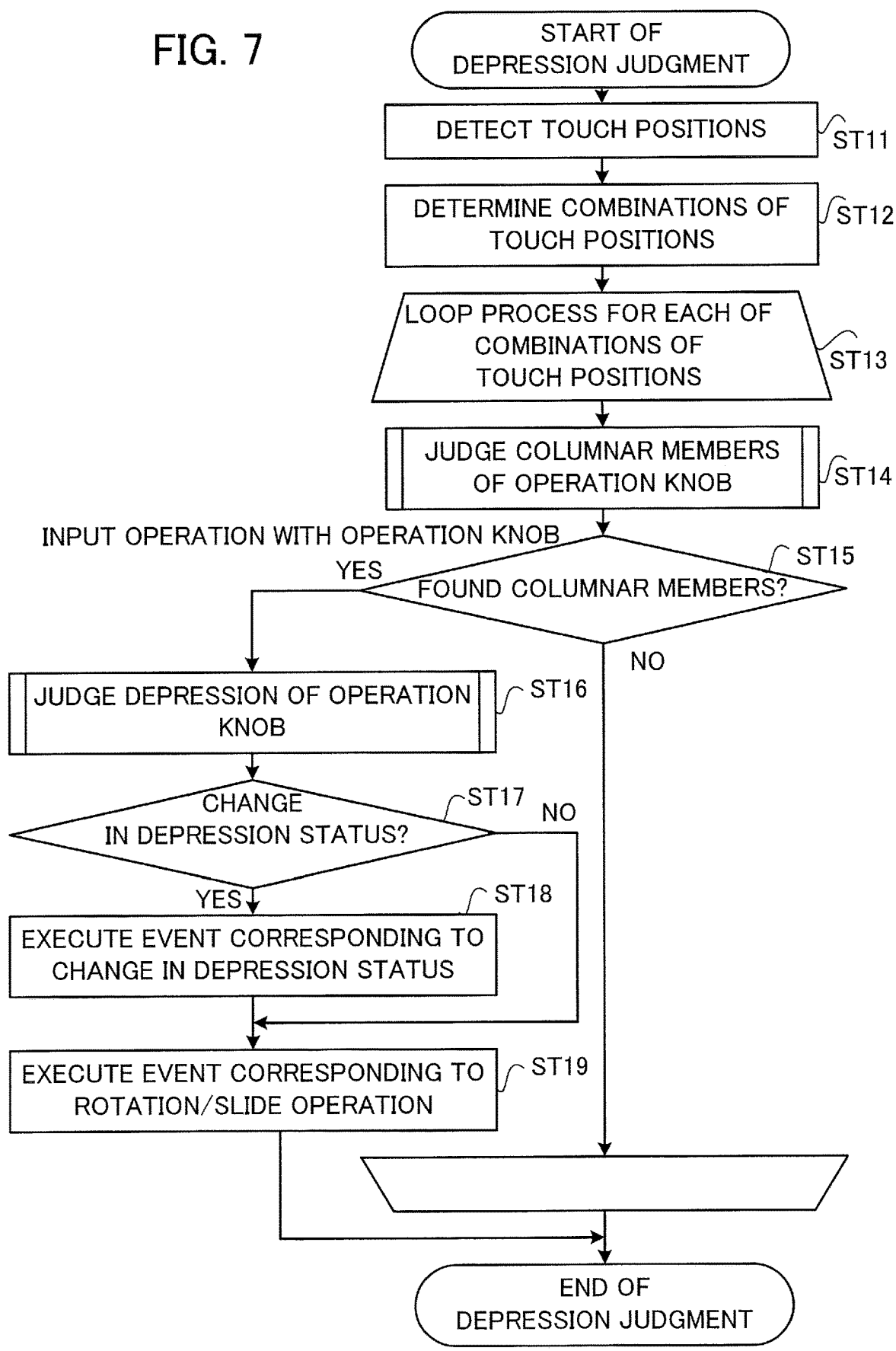
FIG. 7 is a flowchart showing an operation of the touch panel device according to the first embodiment.

FIG. 7 is a flowchart showing an operation of the touch panel device 10. First, in step ST11, the touch detector 12 detects all touch positions on the touch panel 11 and makes notification of the touch information (e.g., an identification number or coordinates, the contact status, the electrostatic capacitance detection value, etc. of each touch position).

In step ST12, the columnar member determiner 13 determines all combinations of three touch positions based on all the touch positions included in the notification from the touch detector 12.

In step ST13, the columnar member determiner 13 repeats processing of steps ST14 and ST15 for all of the combinations of three touch positions.

In step ST14, the columnar member determiner 13 determines the positions of the columnar members 121, 122 and 123 of the operation knob 100 based on the positional relationship among the three touch positions or the detection values of the electrostatic capacitance at the three touch positions.

When the positions of the columnar members 121, 122 and 123 of the operation knob 100 are not found in step ST15, the columnar member determiner 13 repeats the step ST14 until the positions of the columnar members 121, 122 and 123 are found. When no combination satisfying the condition of being the positions of the columnar members 121, 122 and 123 of the operation knob 100 exists in all the combinations of three touch positions (NO in the step ST15), the columnar member determiner 13 judges that the operation knob 100 does not exist on the touch panel 11. In contrast, when positions of the columnar members 121, 122 and 123 of the operation knob 100 satisfying the condition of being the positions of the columnar members 121, 122 and 123 are found (YES in the step ST15), the columnar member determiner 13 stops the search for the columnar members 121, 122 and 123 and advances the process to step ST16.

In the step ST16, the depression judgment unit 14 judges whether or not the operation knob 100 is depressed in regard to the positions of the columnar members 121, 122 and 123 of the operation knob 100 based on the change in the detection values of the electrostatic capacitance.

In step ST17, the depression judgment unit 14 refers to past depression judgment results and judges whether or not there occurs a change in depression status, and advances the process to step ST18 when there occurs a change in the depression status (YES in the step ST17). Otherwise (NO in the step ST17), the depression judgment unit 14 advances the process to step ST19.

In the step ST18, the processor 21 executes an event corresponding to the change in the depression status and notifies the user that there occurs the change in the depression status.

In the step ST19, the processor 21 recognizes a rotation operation or a slide operation of the operation knob 100 and executes an event corresponding to the recognized operation.

Incidentally, in the depression judgment on the operation knob 100 in the step ST16, it is also possible to totalize the electrostatic capacitance detection values at the positions of the three columnar members 121, 122 and 123 and judge that there is the depression if the total value exceeds a threshold value.

Further, in the depression judgment on the operation knob 100 in the step ST16, it is also possible to use an average value of the electrostatic capacitance at the positions of the three columnar members 121, 122 and 123, a change value of the electrostatic capacitance of a columnar member, a total value of the maximum detection value and the second highest detection value among the detection values of the electrostatic capacitance, a detection value of a predetermined columnar member, or the like as a representative value. Furthermore, in the judgment on the depression of the operation knob 100, it is also possible to use a past detection value of the electrostatic capacitance as a reference value and judge that there is the depression when a detection value exceeding the reference value is detected.

(1-5) Effect

As described above, according to the first embodiment, by making it possible to judge whether or not the operation knob 100 is depressed by using the change in the detection values of the electrostatic capacitance in the touch panel 11, without the need of embedding a special circuit in the operation knob 100, the rotation operation or the slide operation of the operation knob 100 can be recognized, and further, the start and the end of depressing the operation knob 100 can be correctly recognized. Thus, according to the first embodiment, an operation equivalent to the touch operation on the touch panel 11 with a finger can be performed by the depressing operation on the operation knob 100.

(1-6) Modification of First Embodiment

Figure 8:
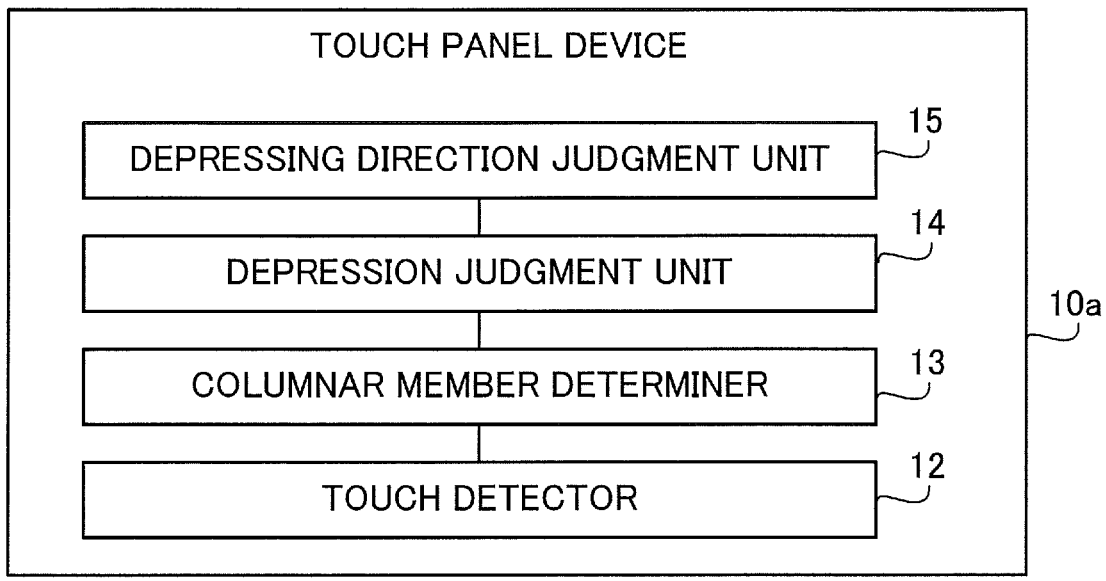
FIG. 8 is a functional block diagram schematically showing a principal configuration of a touch panel device according to a modification of the first embodiment.

In the above description, the touch panel device 10 may judge a depressing direction of the operation knob 100 based on the detection values of the electrostatic capacitance at the positions of the columnar members 121, 122 and 123. FIG. 8 shows a touch panel device 10a further including a depressing direction judgment unit 15 that judges the depressing direction of the operation knob 100. The configuration in FIG. 8 differs from the configuration in FIG. 5 in that the depressing direction judgment unit 15 is added. The rest of the configuration in FIG. 8 is the same as that in FIG. 5.

The depressing direction of the operation knob 100 means the direction of force in a direction parallel to the touch panel 11 when the force in the direction parallel to the touch panel 11 is applied to the operation knob 100 while depressing the operation knob 100 towards the touch panel 11. In cases where the operation knob 100 does not move in parallel with the touch panel 11, the direction of the force in the direction parallel to the touch panel 11 can be detected by, for example, comparing the mode of defamation of the cushion members 131, 132 and 133 with history information on the mode of deformation of the cushion members 131, 132 and 133.

The touch detector 12 detects the touch positions on the touch panel 11. In regard to all the touch positions outputted by the touch detector 12, the columnar member determiner 13 determines the positions of the columnar members 121, 122 and 123 of the operation knob 100 based on the positional relationship or the detection values of the electrostatic capacitance. In regard to the positions of the columnar members 121, 122 and 123 determined by the columnar member determiner 13, the depression judgment unit 14 judges whether the operation knob 100 is in the state of depression or not based on detection positions and detection values of the electrostatic capacitance, the change in the number of contact points in the vicinity of the operation knob 100, or the like. The depressing direction judgment unit 15 judges the depressing direction regarding the depression of the operation knob based on differences between moving distances of the positions of the columnar members 121, 122 and 123 of the operation knob 100 or differences between the detection values, positions of contact points in the vicinity of the operation knob 100, or the like.

By detecting the depressing direction of the operation knob 100, it is possible to change the contents of an event to be executed in response to the operation on the operation knob 100, according to the depressing direction. Accordingly, a greater variety of input operations become possible. For example, on the touch panel 11 displaying a certain cursor, it becomes possible to perform an operation of depressing the operation knob 100 while applying force in an arbitrary direction parallel to the touch panel 11 and thereby moving the cursor in the direction of the force.

Further, to increase the accuracy of distinction from other operations, the touch panel device 10 may also be configured to judge that the operation is the depressing operation only when the operation knob 100 is depressed orthogonally to the touch panel 11 (i.e., straight down). With such a configuration, the touch panel device 10 is prevented from misrecognizing the operation as the depressing operation when force in one direction is applied to the operation knob 100 as in the operation of moving the operation knob 100, for example.

Furthermore, by judging the depressing direction of the operation knob 100 based on differences between the detection values of the electrostatic capacitance at the positions of the columnar members 121, 122 and 123 of the operation knob 100 (namely, amounts of deformation of the cushion members 131, 132 and 133 differ from each other depending on the moving direction), a great variety of input operations on the touch panel device 10 become possible and the accuracy of recognition of the depressing operation performed with the operation knob 100 can be increased.

Incidentally, while the state in which the user is not touching the operation knob 100 is defined as the state of FIG. 4(*a*) in the above description, the initial state in which the user is not touching the operation knob 100 may also be defined as the state of FIG. 4(*b*). In this case, when the user pulls up the operation knob 100, the state of the operation knob 100 becomes the state of FIG. 4(*a*), and when the user finishes pulling up the operation knob 100, the operation knob 100 returns to the initial state of FIG. 4(*b*) by the elastic restoring force of the cushion members 131, 132 and 133.

It is also possible to define the initial state in which the user is not touching the operation knob 100 as an intermediate state between the states of FIG. 4(*a*) and FIG. 4(*b*). In this case, when the user depresses the operation knob 100, the state of the operation knob 100 becomes the state of FIG. 4(*b*) and when the user finishes depressing the operation knob 100, the operation knob 100 returns to the initial state by the elastic restoring force of the cushion members 131, 132 and 133. Further, when the user pulls up the operation knob 100, the state of the operation knob 100 becomes the state of FIG. 4(*a*), and when the user finishes pulling up the operation knob 100, the operation knob 100 returns to the initial state by the elastic restoring force of the cushion members 131, 132 and 133.

(2) Second Embodiment

In the above first embodiment, the description is given of an example in which the touch panel device 10 judges the start and the end of depressing the operation knob 100 by using the change in the electrostatic capacitance (i.e., the change in the detection values of the electrostatic capacitance, the change in the detection positions of the electrostatic capacitance, etc.) due to the change in the contact regions of the lower surface part 140 and the cushion members 131, 132 and 133 as the deforming members of the operation knob 100 (i.e., the change in the contact area, the change in the contact positions, etc.). In a second embodiment, a description will be given of an example in which the touch panel device 10 includes a lower surface part 240 that is an elastic member as a defaming member of an operation knob 200 and judges the start and the end of depressing the operation knob 200 by using the change in the electrostatic capacitance (i.e., the change in the electrostatic capacitance, the change in the detection positions of the electrostatic capacitance) due to the change in the distance between the touch panel 11 and columnar members 221, 222 and 223.

A touch panel input system according to the second embodiment includes the touch panel device 10 and the operation knob 200. Functional blocks of the touch panel device 10 according to the second embodiment are the same as those shown in FIG. 5. Further, a hardware configuration of the touch panel device 10 according to the second embodiment is the same as that in FIG. 6.

Figure 9:
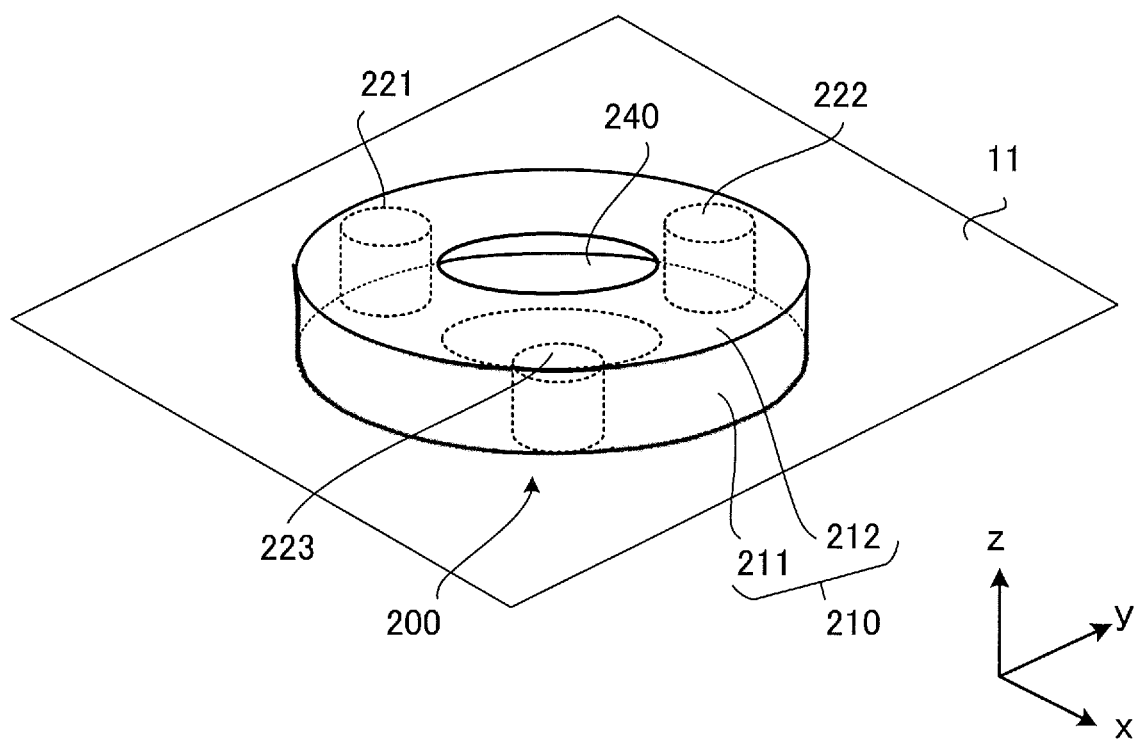
FIG. 9 is a perspective view schematically showing a structure of an operation knob as an operation support device according to a second embodiment of the present invention.
Figure 10A:
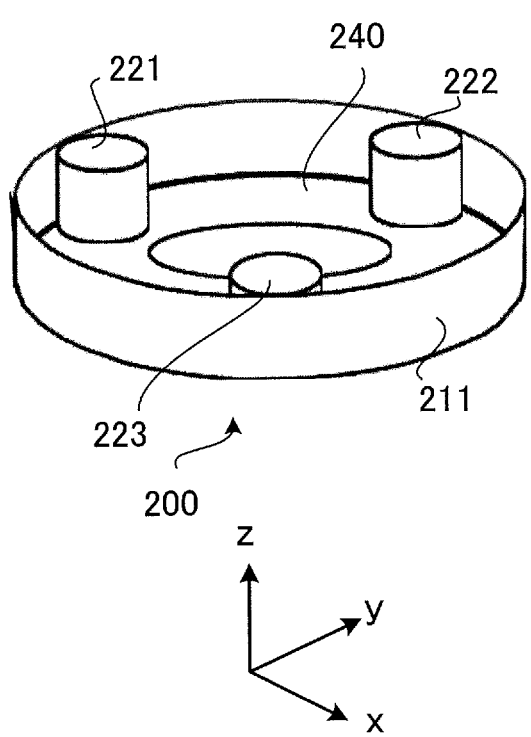
FIGS. 10(a) and 10(b) are a perspective view and a plan view schematically showing an internal structure of the operation knob according to the second embodiment.
Figure 10B:
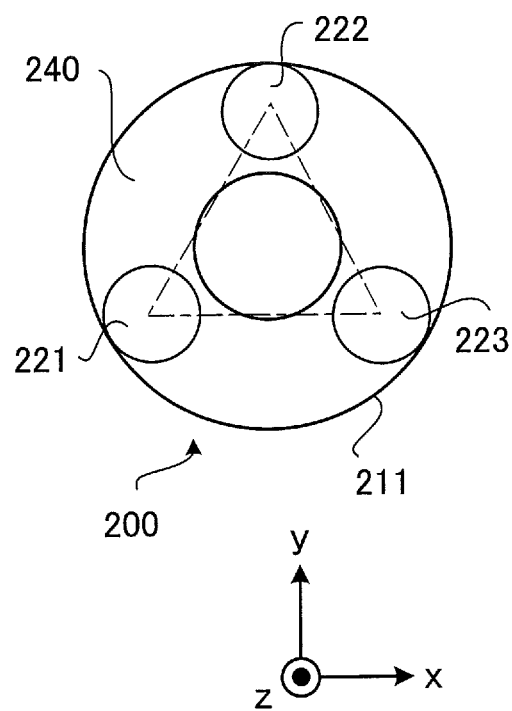

FIG. 9 is a perspective view schematically showing the structure of the operation knob 200 as an operation support device according to the second embodiment. FIGS. 10(*a*) and 10(*b*) are a perspective view and a plan view schematically showing the internal structure of the operation knob 200

As shown in FIG. 9 and FIGS. 10(*a*) and 10(*b*), the operation knob 200 includes a case part 210, the columnar members 221, 222 and 223 as first members attached inside the case part 210, and the lower surface part 240 as a first deforming member provided between the touch panel 11 and the columnar members 221, 222 and 223 and capable of defaming.

The case part 210 may include a side wall part 211 and an upper surface part 212. The columnar members 221, 222 and 223 are formed of conductors. The case part 210 can be formed of resin, for example. The lower surface part 240 can be formed of resin, for example.

The operation knob 200 according to the second embodiment differs from the operation knob 100 according to the first embodiment in that the columnar members 221, 222 and 223 are not provided with the cushion members, and in that the resin-made lower surface part 240 that is in contact with the touch panel 11 when the operation knob 200 is in the state of not being depressed is curved in such a manner that the vicinity of its center is convex downward. In regard to the other features, the second embodiment is the same as the first embodiment.

FIGS. 11(*a*) and 11(*b*) are cross-sectional views schematically showing the internal structure of the operation knob 200. FIG. 11(*a*) shows a state in which the operation knob 200 is not depressed towards the touch panel 11, and FIG. 11(*b*) shows a state in which the operation knob 200 is depressed towards the touch panel 11.

Due to the curve of the lower surface part 240, the distance G1 between the touch panel 11 and the columnar members 221, 222 and 223 increases; however, this gap is at a level where the electrostatic capacitance of the columnar members 221, 222 and 223 is detectable by the touch panel 11. Further, in the touch panel 11, the detection value of the electrostatic capacitance increases proportionally to the shortness of the distance to the columnar members 221, 222 and 223. Thus, in the state in which the operation knob 200 is depressed, the distance G2 between the touch panel 11 and the columnar members 221, 222 and 223 becomes short and the detection value of the electrostatic capacitance increases.

Further, the touch panel device may also be configured to be able to judge the depressing direction based on the detection values of the electrostatic capacitance of the columnar members 221, 222 and 223 similarly to the case of FIG. 8 in the first embodiment.

As described above, according to the second embodiment, by making it possible to judge whether or not the operation knob 200 is depressed by using the change in the detection values of the electrostatic capacitance in the touch panel 11, the rotation operation or the slide operation of the operation knob 200 can be recognized, and further, the depression of the operation knob 200 can be correctly recognized. Namely, according to the second embodiment, an operation equivalent to the touch operation on the touch panel 11 with a finger can be performed by the depressing operation of the operation knob 200.

Further, in the second embodiment, by judging the depressing direction of the operation knob 200 based on differences between the detection values of the electrostatic capacitance at the touch positions of the columnar members 221, 222 and 223 forming the operation knob 200, a great variety of input operations can be made possible and the accuracy of recognition of the depressing operation can be increased.

Incidentally, the initial state in which the user is not touching the operation knob 200 may also be defined as the state of FIG. 11(b). In this case, when the operation knob 200 is pulled up, the state of the operation knob 200 becomes the state of FIG. 11(a), and when the pulling up of the operation knob 200 is finished, the operation knob 200 returns to the initial state of FIG. 11(b) by elastic restoring force of the lower surface part 240.

It is also possible to define the initial state in which the user is not touching the operation knob 200 as an intermediate state between the states of FIG. 11(a) and FIG. 11(b). In this case, when the user depresses the operation knob 200, the state of the operation knob 200 becomes the state of FIG. 11(b), and when the user finishes depressing the operation knob 200, the operation knob 200 returns to the initial state by the elastic restoring force of the lower surface part 240. Further, when the user pulls up the operation knob 200, the state of the operation knob 200 becomes the state of FIG. 11(a), and when the user finishes pulling up of the operation knob 200, the operation knob 200 returns to the initial state by the elastic restoring force of the lower surface part 240.

(3) Third Embodiment

In the above first and second embodiments, the description has been given of examples in which the start and the end of depressing the operation knob 100 or 200 are judged by using the change in the detection values of the electrostatic capacitance at the positions of the columnar members 121, 122 and 123 or the columnar members 221, 222 and 223 forming the operation knob 100 or 200. However, the detection values of the electrostatic capacitance in commercially available touch panels are generally not published, and thus there are cases where the depression judgment cannot be made correctly in a touch panel input system as a combination of the operation knob 100 or 200 in the first or second embodiment and a commercially available touch panel. Therefore, in a third embodiment, a description will be given of an example in which the positions of columnar members of an operation knob 300 are detected by using the change in the touch positions (specifically, moving directions of cushion members) when the operation knob is depressed.

A touch panel input system according to the third embodiment includes the touch panel device 10 and the operation knob 300. Functional blocks of the touch panel device 10 according to the third embodiment are the same as those shown in FIG. 5. Further, the hardware configuration of the touch panel device 10 according to the third embodiment is the same as that shown in FIG. 6.

Figure 12:
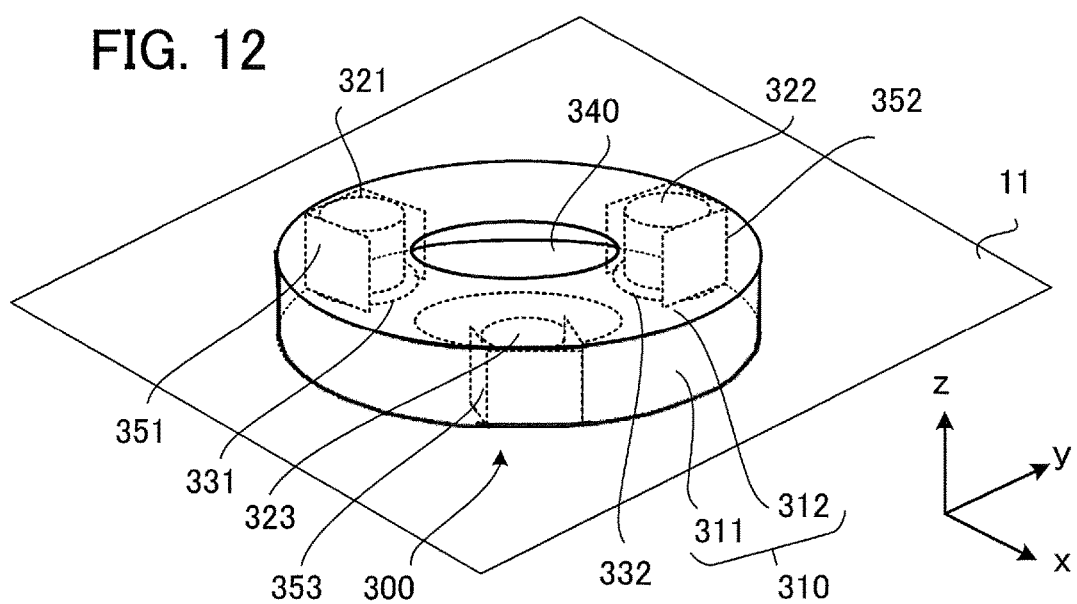
FIG. 12 is a perspective view schematically showing a structure of an operation knob as an operation support device according to a third embodiment of the present invention.
Figure 13A:
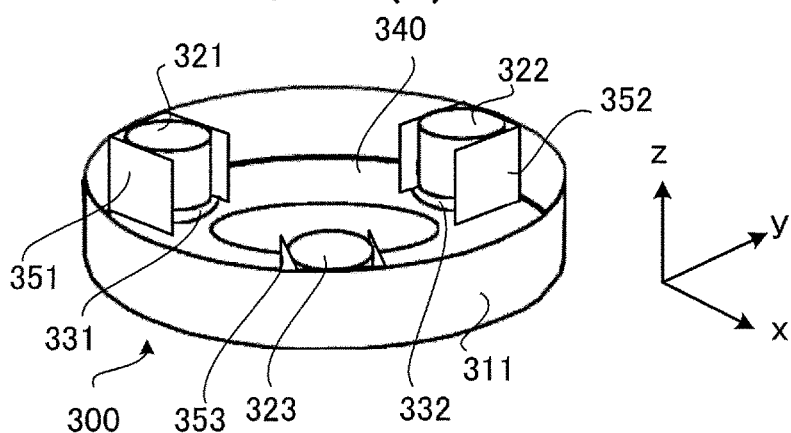
FIG. 13(a) is a perspective view schematically showing an internal structure of the operation knob according to the third embodiment.
Figure 13B:
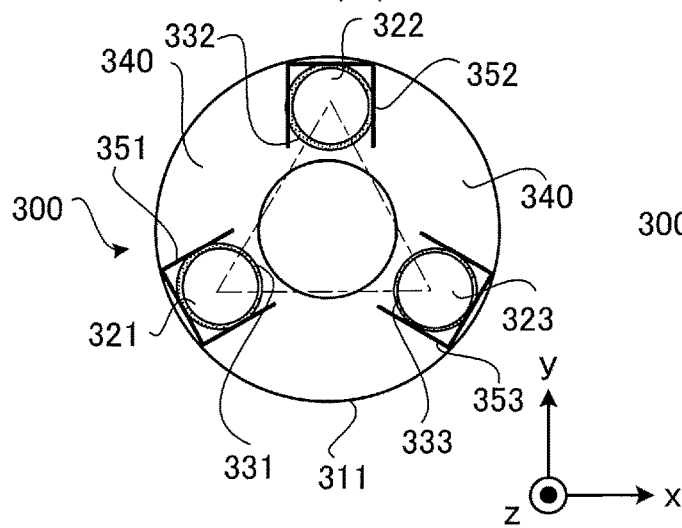
FIGS. 13(b) and 13(c) are plan views showing the internal structure and an operation of the operation knob.
Figure 13C:
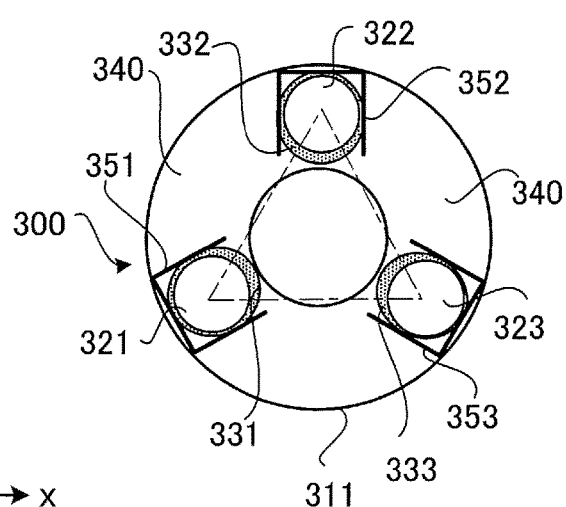

FIG. 12 is a perspective view schematically showing the structure of the operation knob 300 as an operation support device according to the third embodiment. FIG. 13(a) is a perspective view schematically showing the internal structure of the operation knob 300, and FIGS. 13(b) and 13(c) are plan views showing the internal structure and the operation of the operation knob 300.

As shown in FIG. 12 and FIGS. 13(a) to 13(c), the operation knob 300 includes a case part 310, columnar members 321, 322 and 323 as first members attached inside the case part 310, cushion members 331, 332 and 333 as first deforming members provided between the touch panel 11 and the columnar members 321, 322 and 323 and capable of deforming, a lower surface part 340, and partition walls 351, 352 and 353 as wall parts. The partition walls 351, 352 and 353 are guide members attached inside the case part 310 to set deformation directions of the cushion members 331, 332 and 333 to predetermined directions when the case part 310 approaches the touch panel 11. Each partition wall 351, 352, 353 has a cross-sectional shape like the U-shape and has an opening on an inner side.

The case part 310 may include a side wall part 311 and an upper surface part 312. The columnar members 321, 322 and 323 are formed of conductors. The case part 310 can be formed of resin, for example. The lower surface part 340 can be formed with thin sheet-like resin, for example.

The operation knob 300 according to the third embodiment differs from the operation knob 100 according to the first embodiment in including the partition walls 351, 352 and 353. In regard to the other features, the operation knob 300 according to the third embodiment is the same as the operation knob 100 according to the first embodiment.

FIG. 13(b) shows a state in which the operation knob 300 is not depressed towards the touch panel 11, and FIG. 13(c) shows a state in which the operation knob 300 is depressed towards the touch panel 11. In this case, when the operation knob 300 is depressed, the state of the operation knob 300 becomes the state of FIG. 13(c), and when the depressing of the operation knob 300 is finished, the operation knob 300 returns to the initial state of FIG. 13(b) by elastic restoring force of the cushion members 331, 332 and 333.

As shown in FIGS. 13(b) and 13(c), as the case part 310 approaches the touch panel 11 due to the depressing operation by the user to apply downward force to the case part 310 of the operation knob 300, the cushion members 331, 332 and 333 move towards the center of the operation knob 300 and contact regions where the lower surface part 140 and the cushion members 331, 332 and 333 are in contact move towards the center of the operation knob 300. Specifically, in the case of FIG. 13(b), the depressing force is not applied to the case part 310 of the operation knob 300, and thus the deformation of the cushion members 331, 332 and 333 is small and contact regions where the lower surface part 140 and the cushion members 331, 332 and 333 are in contact is small. In contrast, in the case of FIG. 13(c), the depressing force is applied to the case part 310 of the operation knob 300, and thus the deformation of the cushion members 331, 332 and 333 is large and the directions of the deformation are the directions towards the opening's sides of the partition walls 351, 352 and 353, that is, the inward directions.

The operation of the touch panel device 10 when an input operation is performed by using the operation knob 300 is similar to the operation shown in the flowchart of FIG. 7. However, the depression judgment unit 14 in the step ST16 judges whether or not the operation knob 300 is depressed based on the change in the touch positions of the columnar members 321, 322 and 323 of the operation knob 300 (i.e., the touch positions of the cushion members 331, 332 and 333). In regard to the step ST16, an example of the operation of judgment on depression of the operation knob 300 will be described below.

In the structure of FIGS. 13(b) and 13(c), the touch positions move inward as the operation knob 300 is depressed, by which the distance between the touch positions of adjacent columnar members decreases. Accordingly, it is possible, for example, to judge that the depression of the operation knob 300 is present when the total value of the distances between the touch positions of the columnar members 321, 322 and 323 of the operation knob 300 is less than a predetermined threshold value. While the total value of the distances between the touch positions is used in the above example of the step ST16, the judgment on the presence/absence of the depression may also be made by using a different value such as the average value of the distances between the touch positions, magnitude of the changes in the touch positions of the columnar members 321, 322 and 323, or a maximum value or a minimum value among all the changes in the distances between any pair of touch positions. It is also possible to accumulate information indicating the distances between past touch positions and use a distance between past touch positions as a threshold value.

Further, similarly to the case of the first embodiment, it is also possible to judge the depressing direction of the operation knob 300 based on differences between the moving distances of the touch positions of the columnar members 321, 322 and 323. In this case, the configuration of the touch panel device is similar to that in the first embodiment.

As described above, according to the third embodiment, it can be judged whether or not the operation knob 300 is depressed, by using the change in the detection values of the electrostatic capacitance in the touch panel 11, and therefore the rotation operation or the slide operation of the operation knob 300 can be recognized, and further, the depression of the operation knob 300 can be correctly recognized. Thus, according to the third embodiment, an operation equivalent to the touch operation on the touch panel 11 with a finger can be performed by the depressing operation on the operation knob 300.

Further, in the case where it is judged whether or not the operation knob 300 is depressed based on the change in the distances between a plurality of touch positions, it becomes unnecessary to perform a dedicated process such as acquiring the detection values of the electrostatic capacitance from a control unit controlling the touch panel device 10. Therefore, it can be correctly judged whether or not the operation knob 300 is depressed even in a commercially available touch panel whose specifications regarding the detection values of the electrostatic capacitance are unknown.

Furthermore, the depressing direction of the operation knob 300 is judged based on differences between the moving distances of a plurality of touch positions of the columnar members 321, 322 and 323 of the operation knob 300 similarly to the case of the first embodiment, and therefore a great variety of input operations become possible and the accuracy of recognition of the depressing operation can be increased.

Incidentally, the initial state in which the user is not touching the operation knob 300 may also be defined as the state of FIG. 13(c). In this case, when the user pulls up the operation knob 300, the state of the operation knob 300 becomes the state of FIG. 13(b), and when the user finishes pulling up the operation knob 300, the operation knob 300 returns to the initial state of FIG. 13(c) by the elastic restoring force of the cushion members 331, 332 and 333.

It is also possible to define the initial state in which the user is not touching the operation knob 300 as an intermediate state between the states of FIG. 13(b) and FIG. 13(c).

(4) Fourth Embodiment

In the above first through third embodiments, the description has been given of examples in which the motion in which the operation knob 100, 200 or 300 approaches the touch panel 11 (e.g., the depression) or the motion in which the operation knob 100, 200 or 300 separates from the touch panel 11 (e.g., the pulling up) is detected by using the change in the electrostatic capacitance in the touch panel 11 or the change in the positions of the contact regions. However, the change in the detection value of the electrostatic capacitance caused by the depression is extremely small, for example, and thus the accuracy of the detection of the depression or the pulling up of the operation knob by the touch panel device 10 can drop in environments in which disturbance noise is likely to occur. In a fourth embodiment, a description will be given of an example in which the accuracy of the detection of the depression or the pulling up of an operation knob 400 is increased.

A touch panel input system according to the fourth embodiment includes the touch panel device and the operation knob 400. Functional blocks of the touch panel device according to the fourth embodiment are the same as those shown in FIG. 5. Further, a hardware configuration of the touch panel device according to the fourth embodiment is the same as that shown in FIG. 6.

Figure 14:
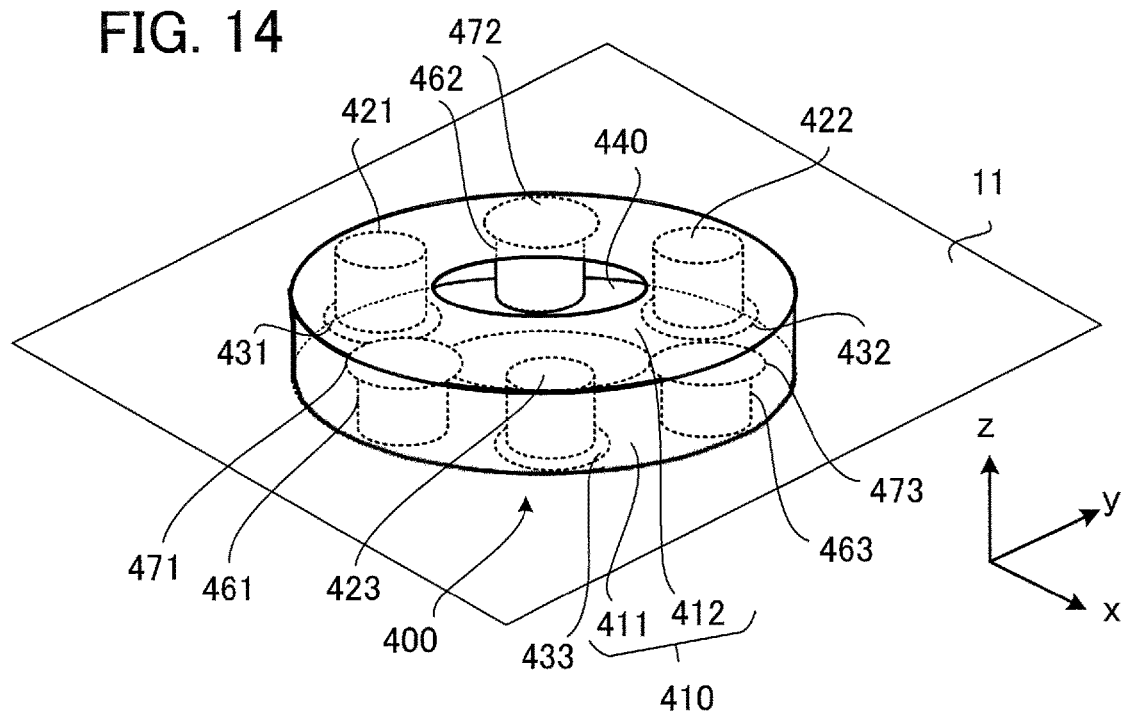
FIG. 14 is a perspective view schematically showing a structure of an operation knob as an operation support device according to a fourth embodiment of the present invention.
Figure 15A:
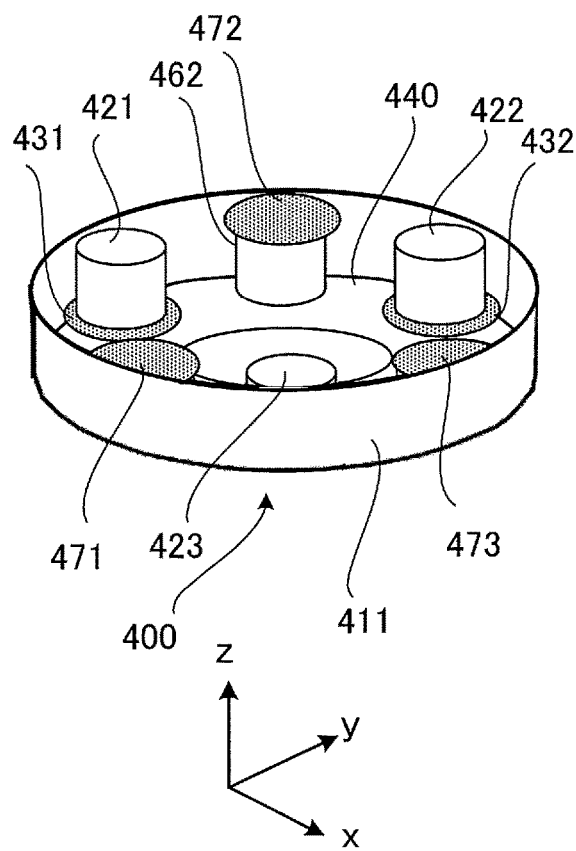
FIGS. 15(a) and 15(b) are a perspective view and a plan view schematically showing an internal structure of the operation knob according to the fourth embodiment.
Figure 15B:
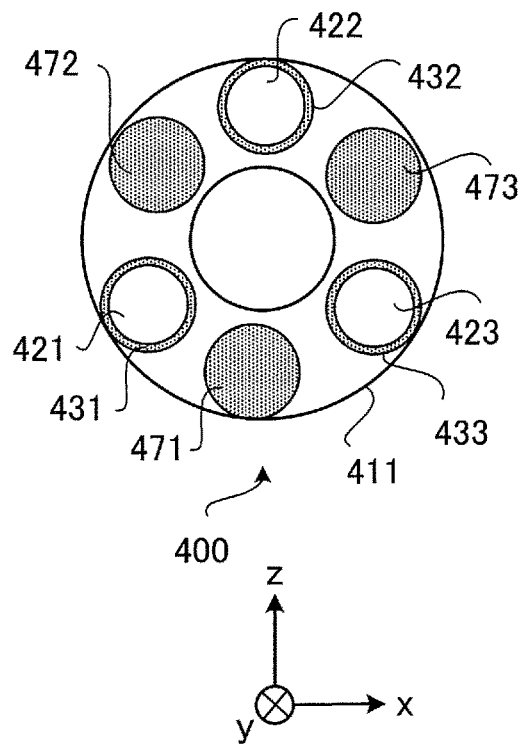

FIG. 14 is a perspective view schematically showing a structure of the operation knob 400 as an operation support device according to the fourth embodiment. FIGS. 15(a) and 15(b) are a perspective view and a plan view schematically showing an internal structure of the operation knob 400.

As shown in FIG. 14 and FIGS. 15(a) and 15(b), the operation knob 400 includes a case part 410, columnar members 421, 422 and 423 as first members attached inside the case part 410, and cushion members 431, 432 and 433 as first deforming members provided between the touch panel 11 and the columnar members 421, 422 and 423 and capable of deforming.

As shown in FIG. 14 and FIGS. 15(a) and 15(b), the operation knob 400 further includes columnar members 461, 462 and 463 as second members attached inside the case part 410 and cushion members 471, 472 and 473 as second defaming members provided between an upper surface part 412 of the case part 410 and the columnar members 461, 462 and 463 and deformed by operation on the case part 410 by the user. The columnar members 461, 462 and 463 are arranged at a plurality of predetermined positions. The columnar members 461, 462 and 463 are arranged at three apex positions of a regular triangle. The cushion members 471, 472 and 473 are conductors similarly to the cushion members 431, 432 and 433. The cushion members 471, 472 and 473 may be elastic members similarly to the cushion members 431, 432 and 433.

The case part 410 may include a side wall part 411 and the upper surface part 412. The columnar members 421, 422 and 423 are formed of conductors. The case part 410 can be formed of resin, for example.

The operation knob 400 according to the fourth embodiment differs from the operation knob 100 according to the first embodiment in including the columnar members 461, 462 and 463 and the cushion members 471, 472 and 473 in addition to the columnar members 421, 422 and 423 and the cushion members 431, 432 and 433. In regard to the other features, the operation knob 400 according to the fourth embodiment is the same as the operation knob 100 according to the first embodiment.

Figure 16A:
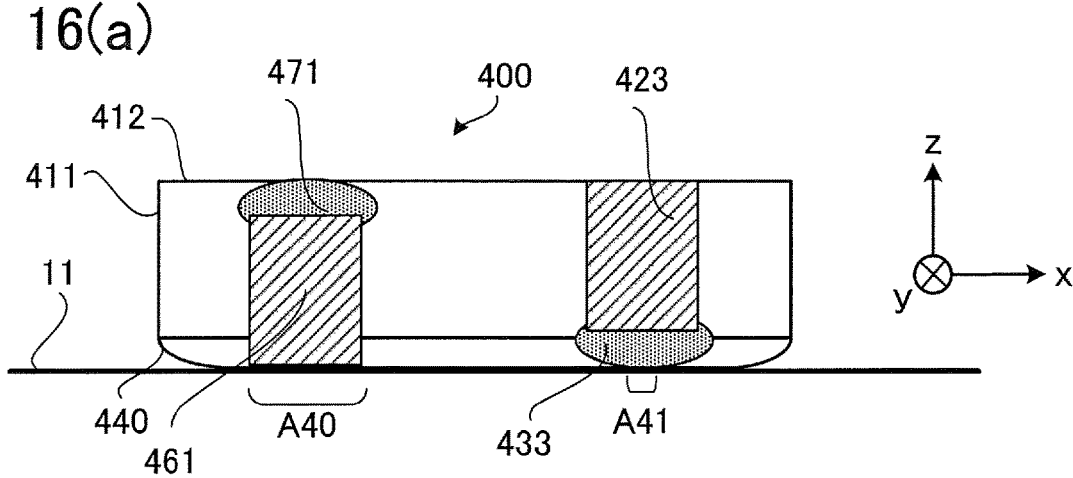
FIGS. 16(a) and 16(b) are cross-sectional views showing the internal structure and the operation of an operation knob according to the fourth embodiment.
Figure 16B:
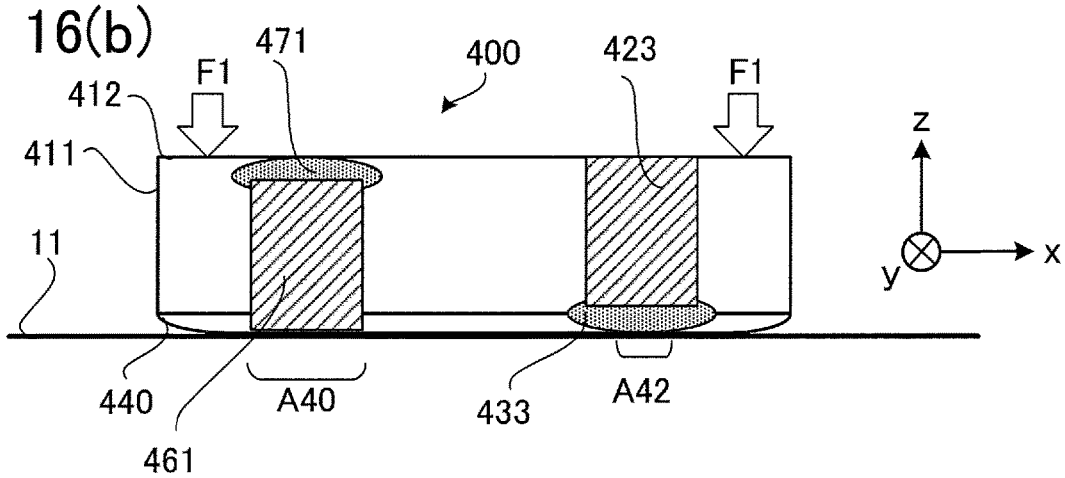

FIGS. 16(a) and 16(b) are cross-sectional views schematically showing the internal structure of the operation knob 400. FIG. 16(a) shows a state in which the operation knob 400 is not depressed towards the touch panel 11, and FIG. 16(b) shows a state in which the operation knob 400 is depressed towards the touch panel 11.

The cushion members 471, 472 and 473 are attached to upper surfaces of the columnar members 461, 462 and 463. Lower surfaces of the columnar members 461, 462 and 463 are in contact with a lower surface part 440, and their contact surfaces have a diameter A40 detectable by the touch panel device 10 having the touch panel 11 and are facing the touch panel 11 via the thin lower surface part 440.

The cushion members 431, 432 and 433 are attached to lower surfaces of the columnar members 421, 422 and 423. In the state in which the operation knob 400 is not depressed, contact surfaces where the cushion members 431, 432 and 433 are in contact with the lower surface part 440 each have a diameter A41 smaller than the diameter detectable on the touch panel 11, and are not detected on the touch panel 11 as touch positions. When the user depresses the operation knob 400 towards the touch panel 11, the cushion members 471, 472 and 473 and the cushion members 431, 432 and 433 are depressed and deformed as shown in FIG. 16(b), and the contact areas of the cushion members 431, 432 and 433 and the lower surface part 440 enlarge to have a diameter A42 detectable by the touch panel device 10.

By configuring the operation knob 400 as shown in FIGS. 15(a) and 15(b) and FIGS. 16(a) and 16(b), when the operation knob 400 is not depressed, the cushion members 431, 432 and 433 having contact parts small in area are not detected as touch positions and the columnar members 461, 462 and 463 having contact parts large in area are detected as touch positions. As shown in FIG. 16(b), when the operation knob 400 is depressed, the area of contact of the cushion members 431, 432 and 433 enlarge and they are also detected as touch positions. When the cushion members 431, 432 and 433 are detected as touch positions, the depression judgment unit 14 judges that the operation knob 400 is in the depressed state.

The process of the judgment on the columnar members in the operation knob 400 is similar to that in the flowchart of FIG. 7. However, in the step ST16, based on arrangement information on the columnar members 421, 422 and 423 and the columnar members 461, 462 and 463 of the operation knob 400, the depression judgment unit 14 determines a center point of their positions and searches for a touch position on a circle centering at the center point. When a new touch position is added on the circle (i.e., within a range of the radius±a permissible error) (that is, when detected touch positions increased), the depression judgment unit 14 judges that the operation knob 400 is depressed. Namely, in cases where the positions of the columnar members 461, 462 and 463 have already been detected, the addition of a touch position occurs when the positions of the columnar members 421, 422 and 423 are detected due to the depression of the operation knob 400.

With the above configuration, whether or not the operation knob 400 is depressed can be judged based on whether or not a touch position of the operation knob 400 is added.

Incidentally, it is also possible to perform the same process as in the first embodiment on the added touch position.

Further, the heights of the cushion members 431, 432, 433, the degree of contact between the cushion members 431, 432, 433 and the lower surface part 440, or rigidity of the materials of the cushion members 431, 432, 433 may differ from cushion member to cushion member. In this case, it is possible to recognize the touch positions stepwise depending on the degree of the depression of the operation knob 400. For example, when the height of the cushion member 431 is the highest, the height of the cushion member 432 is the second highest and the height of the cushion member 433 is the lowest, the cushion members 431, 432 and 433 are respectively detected first, second and last when the operation knob 400 is depressed. With such a configuration, it becomes possible to change the contents of the operation depending on the degree of the depression of the operation knob 400 and thereby increase the variety of operations.

As described above, according to the fourth embodiment, by making it possible to judge whether or not the operation knob 400 is depressed by using the change in the detection values of the electrostatic capacitance in the touch panel 11, the rotation operation or the slide operation of the operation knob 400 can be recognized, and further, the depression of the operation knob 400 can be correctly recognized. Thus, according to the fourth embodiment, an operation equivalent to the touch operation on the touch panel 11 with a finger can be performed through the operation of depressing the operation knob 400.

Further, the method of judging whether the operation knob 400 is in the depressed state or not depending on whether an added touch position, that is, the columnar member 421, 422 or 423 is detected or not is applicable also to commercially available touch panels of which detection sensitivity of the electrostatic capacitance of the touch panel 11 has not been published, and it is possible to perform the judgment on the depression of the operation knob 400 that is more robust, that is, less affected by external factors than that in the first through third embodiments.

Furthermore, by judging the depressing direction of the operation knob 400 based on the detection value or the position of the added touch position or whether or not there is a touch position similarly to the case of the first embodiment, it is possible to enable a great variety of input operations, increase the accuracy of recognition of the depressing operation, and so forth.

Moreover, similarly to the first embodiment, it is possible to define the state in which the user is not touching the operation knob 400 as the state of FIG. 16(b) and recognize the pulling up of the operation knob 400 when the operation knob 400 shifts to the state of FIG. 16(a) due to the user's pulling up of the operation knob 400.

In the above-described first to fourth embodiments, the description has been given of examples in which the motion of the columnar members approaching the touch panel 11 is detected based on the change in the detection values of the electrostatic capacitance. However, it is also possible to detect the motion of the columnar members approaching the touch panel 11 based on, for example, the change in a contact region where the touch panel 11 and the operation knob are in contact with each other, such as the change in the area of the contact region, the change in the contact positions, or the like.

DESCRIPTION OF REFERENCE CHARACTERS

1: touch panel input system, 10, 10a: touch panel device, 11: touch panel, 12: touch detector, 13: columnar member determiner (member determiner), 14: depression judgment unit, 15: depressing direction judgment unit, 100, 200, 300, 400: operation knob (operation support device), 110, 210, 310, 410: case part (grip part), 111, 211, 311, 411: side wall part, 112, 212, 312, 412: upper surface part, 121-123, 221-223, 321-323, 421-423: columnar member (first member), 131-133, 331-333, 431-433: cushion member (first defaming member), 140, 340, 440: lower surface part, 240: lower surface part (first defaming member), 351-353: partition wall (wall part), 461-463: columnar member (second member), 471-473: cushion member (second deforming member).

What is claimed is:

1. An operation support device that is placed on a touch panel detecting a change in electrostatic capacitance or a change in a contact region and supports an input operation performed through the touch panel, comprising:
   a case part;
   a first member attached inside the case part;
   a first deforming member that is an elastic member provided on an end of the first member and is provided between the first member and the touch panel; and
   a wall part that is attached inside the case part and adjacent to the first deforming member on multiple sides thereof so as to set a direction of deformation of the first deforming member, when the case part approaches the touch panel, to a predetermined direction in plan view of the touch panel,
   wherein as the case part approaches the touch panel, the electrostatic capacitance in a region facing the first deforming member increases due to deformation of the first deforming member or area of the contact region of the first deforming member increases due to deformation of the first deforming member.

2. The operation support device according to claim 1, wherein the first member is arranged at each of a plurality of predetermined positions.

3. The operation support device according to claim 1, wherein the first member is a conductor.

4. An operation support device that is placed on a touch panel detecting a change in electrostatic capacitance or a change in a contact region and supports an input operation performed through the touch panel, comprising:
   a case part;
   a first member attached inside the case part;
   a first deforming member provided between the first member and the touch panel;
   a second member attached inside the case part; and
   a second deforming member that is provided between the second member and an upper surface part of the case part and deforms due to an operation on the case part,
   wherein as the case part approaches the touch panel, the electrostatic capacitance in a region facing the first deforming member increases due to deformation of the first deforming member or area of the contact region of the first deforming member increases due to deformation of the first deforming member, and
   wherein at least one of a rotation operation and a sliding operation performed by the user on the case part is detectable by the touch panel based on the deformation of the first deforming member.

5. The operation support device according to claim 4, wherein
   when a distance from the touch panel to the case part is a first distance, the electrostatic capacitance in a region facing the second member is higher than or equal to a predetermined value and the electrostatic capacitance in the region facing the first deforming member is less than the predetermined value, and
   when the distance from the touch panel to the case part is a second distance shorter than the first distance, the electrostatic capacitance in the region facing the second member is higher than or equal to the predetermined value and the electrostatic capacitance in the region facing the first deforming member is higher than or equal to the predetermined value.

6. The operation support device according to claim 4, wherein the second member is arranged at each of a plurality of predetermined positions.

7. The operation support device according to claim 4, wherein the second deforming member is an elastic member.

8. The operation support device according to claim 4, wherein the second member is a conductor.

9. A touch panel device operated by using an operation support device that is placed on a touch panel detecting changes in electrostatic capacitance or changes in contact regions and includes a case part, first members encased within the case part and respectively attached to positions in the case part, and first deforming members respectively provided between the first members and the touch panel so that the electrostatic capacitance in regions facing the first deforming members increase due to deformation of the first deforming members or area of the contact regions of the first deforming members increase due to deformation of the first deforming members as the case part approaches the touch panel, the touch panel device comprising:
   the touch panel;
   processing circuitry
      to detect touch positions with respect to the touch panel by detecting the changes in the electrostatic capacitance or the changes in the contact regions on the touch panel;
      to determine positions of the first members;
      to judge when depression that is approach of the operation support device to the touch panel is performed, based on the changes in the electrostatic capacitance in the regions facing the first deforming members or changes in the area of the contact regions of the first deforming members; and
      to judge a depressing direction as a direction of force parallel to the touch panel applied to the case part of the operation support device, based on differences between amounts of deformation of the first deforming members, when the depression of the operation support device is judged to be performed.

10. A touch panel input system comprising:
    a touch panel device including a touch panel and a processing circuitry to detect a change in electrostatic capacitance or a change in a contact region; and
    the operation support device according to claim 1 that is placed on the touch panel and supports an input operation performed through the touch panel.

11. A touch panel input system comprising:
    a touch panel device including a touch panel and a processing circuitry to detect a change in electrostatic capacitance or a change in a contact region; and the operation support device according to claim 4 that is placed on the touch panel and supports an input operation performed through the touch panel.

\* \* \* \* \*